(12) United States Patent
Mitadera et al.

(10) Patent No.: US 8,124,204 B2
(45) Date of Patent: Feb. 28, 2012

(54) MULTI-LAYERED BOTTLE

(75) Inventors: Jun Mitadera, Kanagawa (JP);
Tomomichi Kanda, Kanagawa (JP);
Kazunobu Maruo, Kanagawa (JP);
Masashi Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1014 days.

(21) Appl. No.: 11/994,660

(22) PCT Filed: Jul. 6, 2006

(86) PCT No.: PCT/JP2006/313513
§ 371 (c)(1),
(2), (4) Date: Jan. 4, 2008

(87) PCT Pub. No.: WO2007/007649
PCT Pub. Date: Jan. 18, 2007

(65) Prior Publication Data
US 2009/0120900 A1 May 14, 2009

(30) Foreign Application Priority Data

Jul. 8, 2005 (JP) ................... 2005-200713
Aug. 2, 2005 (JP) ................... 2005-224400

(51) Int. Cl.
*B32B 27/08* (2006.01)
*B32B 27/34* (2006.01)
*B32B 27/36* (2006.01)

(52) U.S. Cl. .............. 428/36.7; 428/35.7; 428/36.6

(58) Field of Classification Search .............. 428/34.1, 428/34.4, 34.6, 34.7, 35.7, 36.4, 36.6, 36.7
See application file for complete search history.

(56) References Cited

U.S. PATENT DOCUMENTS

| | | |
|---|---|---|
| 4,398,642 A | 8/1983 | Okudaira et al. |
| 5,028,462 A | 7/1991 | Matlack et al. |
| 5,222,615 A | 6/1993 | Ota et al. |
| 5,314,987 A * | 5/1994 | Kim et al. ............ 528/289 |

(Continued)

FOREIGN PATENT DOCUMENTS

EP  0 180 191   5/1986

(Continued)

OTHER PUBLICATIONS

Extended European Search Report dated Dec. 19, 2011, for EP Application No. 06780839.4-2124/1902838 (PCT/JP2006/313513).

*Primary Examiner* — Walter B Aughenbaugh
(74) *Attorney, Agent, or Firm* — Antonelli, Terry, Stout & Kraus, LLP.

(57) ABSTRACT

There is provided a multilayer bottle comprising a barrel portion including an outermost layer, an innermost layer and at least one barrier layer interposed between the outermost layer and the innermost layer, which satisfies the requirements represented by the following formulae (1) to (3) at the same time:

$$OTR \leq 0.2 \ cc \cdot mm/(m^2 \cdot day \cdot atm) \quad (1)$$

where OTR represents an average oxygen transmission rate of the barrier layer of the barrel portion;

$$20 \leq (\text{Average degree of orientation of barrier layer of barrel portion}) \leq 45; \text{ and} \quad (2)$$

$$0 \leq b/a \times 100 \leq 200 \quad (3)$$

where "a" represents an average thickness (μm) of the barrier layer of the barrel portion; and "b" represents an average thickness (μm) of the barrier layer of a bottom portion of the bottle. The multilayer bottle is free from delamination owing to impact upon dropping even when the bottle is formed with irregularities and bends and therefore exhibits a large freedom of design choice.

8 Claims, 3 Drawing Sheets

U.S. PATENT DOCUMENTS

| | | |
|---|---|---|
| 6,359,055 B1 * | 3/2002 | Delannoy et al. ............ 524/514 |
| 6,962,743 B2 | 11/2005 | Mitadera et al. |
| 2001/0054597 A1 | 12/2001 | Ozawa et al. |
| 2004/0256399 A1 | 12/2004 | Tanaka et al. |
| 2005/0009976 A1 | 1/2005 | Akkapeddi et al. |
| 2007/0224375 A1 | 9/2007 | Sato et al. |

FOREIGN PATENT DOCUMENTS

| | | |
|---|---|---|
| EP | 1 736 300 | 12/2006 |
| JP | 01-294426 | 11/1989 |
| JP | 07-035306 | 2/1995 |
| JP | 11-255229 | 9/1999 |
| JP | 2000-254963 | 9/2000 |
| JP | 2001-199024 | 7/2001 |
| JP | 2001-206336 | 7/2001 |
| JP | 2004-160935 | 6/2004 |
| JP | 2004-323053 | 11/2004 |
| WO | WO 2005/118289 A1 | 12/2005 |

* cited by examiner outside portion of bottle | inside portion of bottle

MULTI-LAYERED BOTTLE

TECHNICAL FIELD

The present invention relates to techniques for preventing delamination of multilayer bottles having an excellent gas-barrier property, and more particularly to techniques for preventing delamination of multilayer bottles upon filling contents thereinto, upon transportation or upon exposure to impact upon dropping by improving an interlaminar bonding strength between an innermost or outermost layer and an intermediate layer formed therebetween. In addition, the present invention relates to multilayer bottles which are free from delamination between these layers even without forming the bottles into a shape with less irregularities and less bends, and have a large freedom of design choice.

BACKGROUND ART

At present, plastic containers (bottles, etc.) made mainly of polyesters such as polyethylene terephthalate (PET) have been extensively used as containers for teas, fruit juices, carbonated beverages, etc. Among these plastic containers, small-size plastic bottles have increased in proportion year by year. In general, as the size of a bottle is reduced, a surface area thereof per unit volume tends to increase. Therefore, a gustoish period of contents in the small-size bottles tends to be shortened. In recent years, beer susceptible to influences of oxygen and light as well as hot tea which are filled in a plastic bottle have been put on the market. Thus, with the recent tendency that the plastic containers are used in more extensive applications, the plastic containers have been required to be further improved in gas-barrier property.

To meet the above requirement for imparting a good gas-barrier property to plastic bottles, there have been developed multilayer bottles produced from thermoplastic polyester resin and gas-barrier resin, blend bottles, barrier-coated bottles produced by forming a carbon coat, a deposited coat or a barrier resin coat onto a single layer bottle made of a thermoplastic polyester resin, etc.

The multilayer bottles, for example, those bottles produced by subjecting a three- or five-layer preform (parison) obtained by injecting a thermoplastic polyester resin such as PET for forming innermost and outermost layers and a thermoplastic gas-barrier resin such as poly-m-xylyleneadipamide (polyamide MXD6) into a mold cavity, to biaxial stretch blow-molding, have been put into practice.

Further, resins having an oxygen-capturing function for capturing oxygen within the container while preventing penetration of oxygen from an outside of the container have been developed and applied to multilayer bottles. The oxygen-capturing bottles are suitably in the form of a multilayer bottle including a gas-barrier layer made of polyamide MXD6 in which a transition metal-based catalyst is blended, from the viewpoints of oxygen-absorbing velocity, transparency, strength, moldability, etc.

The above multilayer bottles have been used as containers for beer, tea, carbonated beverages, etc., because of their good gas-barrier property. When the multilayer bottles are used in these applications, contents filled therein can maintain a good quality with an improved shelf life. On the other hand, the multilayer bottles tend to undergo delamination between different resin layers, for example, between the innermost or outermost layer and the intermediate gas-barrier layer, resulting in significant damage to their commercial value. In particular, when the multilayer bottles are formed into an irregular shape for the purposes of imparting a good design property thereto or enhancing a strength thereof, there tends to arise such a problem that irregular portions of the bottles suffer from delamination.

To solve the above problems, there has been proposed such a method in which when a resin for forming the innermost and outermost layers is finally injected into a mold cavity, a given amount of the resin is flowed in a reverse direction toward the side of the intermediate gas-barrier layer using a reverse-flow controller to produce a preform containing a coarse mixed resin introduced between the layers, thereby improving a delamination resistance of the resultant multilayer bottle (refer to Patent Document 1). However, in this method, it is required to use the special apparatus. Also, there has been proposed the method for producing a multilayer bottle by a stretch blow molding method in which a preform once blow-molded is contracted under heating and then subjected again to blow molding under a high pressure (refer to Patent Document 2). However, in this method, there tend to occur problems such as defective shape of the resultant molded product, complicated time-consuming procedure and insufficient delamination resistance.

Patent Document 1: JP 2000-254963A
Patent Document 2: JP 2001-206336A

DISCLOSURE OF THE INVENTION

An object of the present invention is to solve the above conventional problems, and provide a multilayer bottle that is free from occurrence of delamination upon drop or impact, need not be formed into specific shapes with less irregularities or less bends for inhibiting the delamination, and has a large freedom of design choice.

As the result of extensive and intensive researches concerning delamination resistance of multilayer bottles, the present inventors have found that when controlling a thickness of a barrier layer in the bottle to a specific range, an energy applied to the barrier layer upon impact is well reduced, and when controlling an degree of orientation of the barrier layer to a specific range, the resultant multilayer bottle is improved in interlaminar bonding strength, and is free from delamination upon dropping, etc. Further, it has been found that when forming irregular portions of the multilayer bottle into a specific shape, an energy applied to the barrier layer upon impact is well reduced, and the resultant multilayer bottle is free from delamination upon drop impact, etc. The present invention has been accomplished on the basis of these findings.

Thus, the present invention relates to a multilayer bottle comprising a barrel portion including an outermost layer, an innermost layer and at least one barrier layer interposed between the outermost layer and the innermost layer, wherein the outermost layer and the innermost layer are each made mainly of a thermoplastic polyester resin obtained by polymerizing a dicarboxylic acid component containing 80 mol % or more of terephthalic acid with a diol component containing 80 mol % or more of ethylene glycol; and the multilayer bottle satisfies the requirements represented by the following formulae (1) to (3) at the same time:

$$\mathrm{OTR} \leq 0.2 \ \mathrm{cc \cdot mm/(m^2 \cdot day \cdot atm)} \tag{1}$$

where OTR represents an average oxygen transmission rate of the barrier layer of the barrel portion as measured at a temperature of 23° C. and a relative humidity of 60%;

$$20 \leq (\text{Average degree of orientation of barrier layer of barrel portion}) \leq 45 \tag{2}$$

where the degree of orientation represents a value calculated from refractive indexes of the barrier layer as measured at 23° C. using an Abbe refractometer according to the following formula:

Degree of orientation=$[\{n(x)+n(y)\}/2-n(z)]\times 1000$ (5)

where n(x) represents a refractive index of the barrier layer in a height direction of the bottle; n(y) represents a refractive index of the barrier layer in a circumferential direction of the bottle; and n(z) represents a refractive index of the barrier layer in a thickness direction thereof, and $$0 \leq b/a \times 100 \leq 200 \quad (3)$$

where "a" represents an average thickness (μm) of the barrier layer of the barrel portion; and "b" represents an average thickness (μm) of the barrier layer of a bottom portion of the bottle, wherein, in the above respective formulae, the bottom portion is defined as a portion extending from a ground portion of the bottle to a position corresponding to 20% of a height between the ground portion and an opening portion of the bottle; the barrel portion is defined as a portion except for the ground portion which has an outer diameter corresponding to 80% or more of a maximum outer diameter of the ground portion; and the ground portion is defined as a portion contacting with a floor when the bottle is vertically placed thereon.

Further, the present invention relates to a multilayer bottle comprising an outermost layer, an innermost layer and at least one barrier layer interposed between the outermost layer and the innermost layer, wherein the multilayer bottle is provided on a side wall surface thereof with at least one concave portion and/or at least one convex portion; the outermost layer and the innermost layer are each made mainly of a thermoplastic polyester resin obtained by polymerizing a dicarboxylic acid component containing 80 mol % or more of terephthalic acid with a diol component containing 80 mol % or more of ethylene glycol; and the concave portion satisfies the following requirements (4) to (6) at the same time:

(4) an angle (Aa) between a tangential line of a bottom of the concave portion and a tangential line of a side face of the concave portion being 100° or more;

(5) an angle (Ab) between a tangential line of the side wall surface of the bottle and a tangential line of the side face of the concave portion being 80° or less; and (6) a depth (Ac) of the concave portion being 10% or less of an outer diameter of a portion including the concave portion, and the convex portion satisfies the following requirements (7) to (9) at the same time:

(7) an angle (Ba) between a tangential line of the side wall surface of the bottle and a tangential line of a side face of the convex portion being 100° or more;

(8) an angle (Bb) between a tangential line of an apex of the convex portion and a tangential line of the side face of the convex portion being 80° or less; and (9) a height (Bc) of the convex portion being 10% or less of an outer diameter of a portion including the convex portion.

BEST MODE FOR CARRYING OUT THE INVENTION

Figure 1:
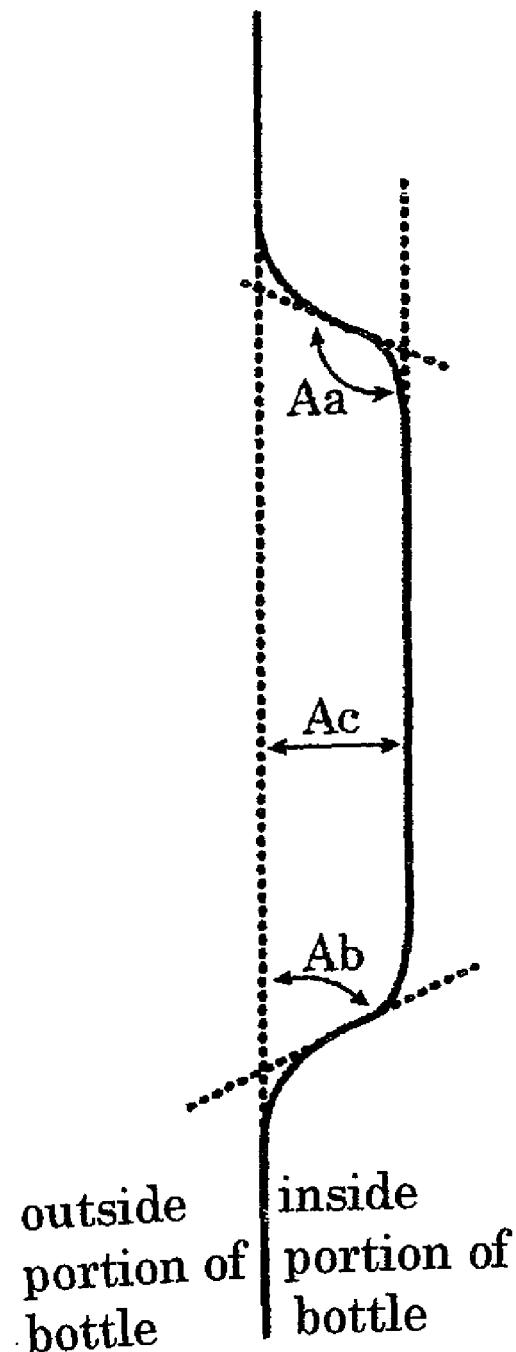
FIG. 1 is a vertical sectional view showing a concave portion of a multilayer bottle according to the present invention.

The thermoplastic polyester resin used for forming an outermost layer, an innermost layer and optionally a part of an intermediate layer of the multilayer bottle according to the present invention is a polyester resin (hereinafter referred to merely as a "polyester A") which is obtained by polymerizing a dicarboxylic acid component containing terephthalic acid in an amount of 80 mol % or more and preferably 90 mol % or more (including 100 mol %), with a diol component containing ethylene glycol in an amount of 80 mol % or more and preferably 90 mol % or more (including 100 mol %).

The polyester A used in the present invention is preferably polyethylene terephthalate. Polyethylene terephthalate is excellent in all of transparency, mechanical strength, injection-moldability and stretch blow-moldability.

Examples of dicarboxylic acids other than terephthalic acid which may be contained in the dicarboxylic acid component include isophthalic acid, diphenyl ether-4,4-dicarboxylic acid, naphthalene-1,4- or -2,6-dicarboxylic acid, adipic acid, sebacic acid, decane-1,10-carboxylic acid and hexahydroterephthalic acid. Examples of diols other than ethylene glycol which may be contained in the diol component include propylene glycol, 1,4-butanediol, neopentyl glycol, diethylene glycol, cyclohexane dimethanol, 2,2-bis(4-hydroxyphenyl)propane and 2,2-bis(4-hydroxyethoxyphenyl)propane. Further, oxy acids such as p-oxybenzoic acid may also be used as a raw monomer of the polyester A.

The polyester A has an intrinsic viscosity of from 0.55 to 1.30 and preferably from 0.65 to 1.20. When the polyester A has an intrinsic viscosity of 0.55 or more, it is possible to produce not only a transparent amorphous multilayer preform but also a multilayer bottle having a satisfactory mechanical strength. Also, when the polyester A has an intrinsic viscosity of 1.30 or less, the multilayer bottle can be readily molded therefrom without deterioration in fluidity upon molding.

Further, the polyester A from which the outermost or innermost layer of the multilayer bottle is mainly formed may also contain other thermoplastic resins or various additives unless the addition thereof adversely affects the aimed effects of the present invention. In this case, the outermost or innermost layer preferably contains the polyester A in an amount of 90% by weight or more (including 100% by weight). Examples of the other thermoplastic resins include thermoplastic polyester resins such as polyethylene-2,6-naphthalenedicarboxylate, polyolefin-based resins, polycarbonates, polyacrylonitrile, polyvinyl chloride and polystyrene. Examples of the additives include ultraviolet absorbers, oxygen absorbers, colorants, and infrared absorbers (reheating additives) for accelerating heating of the preform and shortening a cycle time upon molding.

The multilayer bottle of the present invention satisfies the requirements represented by the following formulae (1) to (3) at the same time:

$$OTR \leq 0.2 \text{ cc·mm}/(\text{m}^2 \cdot \text{day} \cdot \text{atm}) \quad (1)$$

where OTR represents an average oxygen transmission rate of the barrier layer of the barrel portion;

$$20 \leq DOR \leq 45 \quad (2)$$

where DOR represents an average degree of orientation of the barrier layer of the barrel portion; and $$0 \leq b/a \times 100 \leq 200 \quad (3)$$

where "a" represents an average thickness (μm) of the barrier layer of the barrel portion; and "b" represents an average thickness (μm) of the barrier layer of a bottom portion of the bottle.

Figure 3:
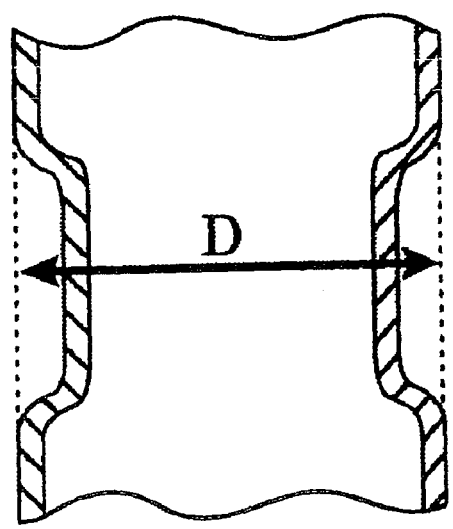
FIG. 3 is a vertical sectional view schematically showing an outer diameter of a barrel portion of a multilayer bottle having a concave portion on the barrel portion in which the bottle having a single-layer side wall is shown for convenience.
Figure 4:
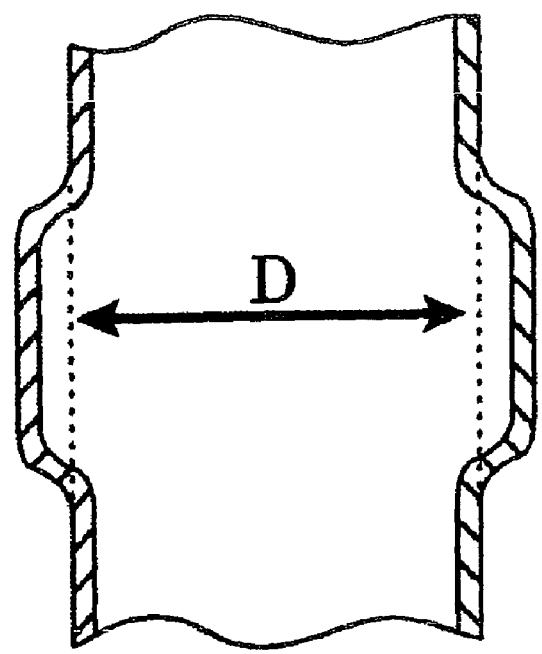
FIG. 4 is a vertical sectional view schematically showing an outer diameter of a barrel portion of a multilayer bottle having a convex portion on the barrel portion in which the bottle having a single-layer side wall is shown for convenience.
Figure 5:
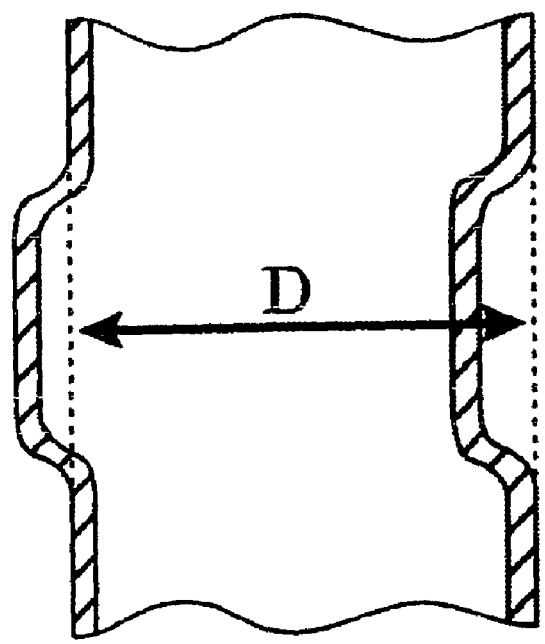
FIG. 5 is a vertical sectional view schematically showing an outer diameter of a barrel portion of a multilayer bottle having concave and convex portions on the barrel portion in which the bottle having a single-layer wall is shown for convenience.

In the present invention, the "bottom portion" is defined as a portion extending from a ground portion of the bottle to a position corresponding to 20% of a height between the ground portion and an opening portion of the bottle; the "barrel portion" is defined as a portion except for the ground portion which has an outer diameter corresponding to 80% or more of a maximum outer diameter of the ground portion; and the "ground portion" is defined as a portion contacting with a floor when the bottle is vertically placed thereon. The outer diameter of the respective portions means a diameter when the barrel or ground portion has a circular sectional shape, or a length of a diagonal line when these portions have a polygonal sectional shape such as square and hexagon. The outer diameter of the ground portion may be measured by the method of applying an ink to a bottom surface of the bottle and pressing the bottom surface onto a paper, etc. In the present invention, in the case where a convex portion and/or a concave portion are formed on the barrel portion of the bottle for the purpose of retaining a good strength, etc., a length corresponding to an outer diameter of an imaginary barrel portion formed assuming that no convex nor concave portion is present on the barrel portion, is regarded as the outer diameter of the barrel portion of the bottle as shown in FIGS. 3 to 5.

The oxygen transmission rate (OTR) of the barrier layer of the barrel portion is measured at a temperature of 23° C. and a relative humidity (RH) of 60%. The OTR is preferably 0.15 cc·mm/(m²·day·atm) or less, more preferably 0.10 cc·mm/(m²·day·atm) or less and still more preferably 0.08 cc·mm/(m²·day·atm) or less. When the OTR of the barrier layer of the barrel portion lies within the above-specified range, the obtained multilayer bottle exhibits a good gas-barrier property and is capable of prolonging a consumable date of contents to be preserved therein.

The degree of orientation (DOR) of the barrier layer of the barrel portion is preferably from 25 to 45. The degree of orientation is a value calculated from refractive indices of the barrier layer as measured at 23° C. using an Abbe refractometer according to the following formula:

$$\text{Degree of orientation} = [\{n(x)+n(y)\}/2 - n(z)] \times 1000$$

where n(x) represents a refractive index of the barrier layer in a height direction of the bottle; n(y) represents a refractive index of the barrier layer in a circumferential direction of the bottle; and n(z) represents a refractive index of the barrier layer in a thickness direction thereof.

Also, the degree of orientation (average value) of the barrier layer in the bottom portion of the bottle is preferably from 20 to 45 and more preferably from 25 to 45.

The degree of orientation is used as an index showing a degree of orientation of a polymer molecule, i.e., a degree of crystallization thereof. The larger the degree of orientation, the higher the content of the polymer molecule well oriented. The degree of orientation of the barrier layer can be controlled by adjusting the blow-molding conditions therefor. More specifically, the degree of orientation of the barrier layer can be controlled to the above-specified range by suitably adjusting the blow-molding conditions such as primary blow pressure, primary blow retardation time, secondary blow pressure and temperature of a heater. When the degree of orientation lies within the above-specified range, the barrier layer is kept in a uniformly stretched state, and exhibits a large distortion after blow molding and an improved interlaminar bonding strength, resulting in a good delamination resistance between layers of the resultant bottle.

The value "b/a×100" is preferably from 0 to 150. The value "b/a×100" of more than 100 means that a thickness of the barrier layer of the bottom portion is larger than that of the barrel portion, whereas the value "b/a×100" of less than 100 means that the thickness of the barrier layer of the bottom portion is smaller than that of the barrel portion. The value "b/a×100" of 0 means that no barrier layer is present in the bottom portion. When no barrier layer is present in an entire part of the bottom portion, the resultant bottle tends to be deteriorated in barrier property. Therefore, the barrier layer is preferably omitted only in the bottom portion close to the ground portion, but provided in the remaining bottom portion.

When the value "b/a×100" lies within the above-specified range, the change in thickness of the barrier layer from the barrel portion to the ground portion is lessened and becomes moderated. Therefore, when the bottle is exposed to impact upon dropping, etc., the impact energy is not concentrated to a part of the barrier layer and received and relaxed by an entire part of the barrier layer, resulting in less occurrence of delamination therein. In addition, since the barrier layer undergoes a less deformation when impact is applied to the bottle, delamination of the bottle is unlikely to occur. Further, in the case of the bottle having irregularities or bends, since the impact applied thereto is received and relaxed by an entire part of the barrier layer, delamination of the bottle is unlikely to occur. Therefore, the shape of the multilayer bottle is not particularly limited to those having less irregularities and less bends, resulting in large freedom of design.

The multilayer bottle provided on a side wall surface thereof with one or plural concave portions and/or convex portions can also be effectively prevented from suffering from delamination by controlling the shape of the concave portions and/or convex portions, thereby achieving a large freedom of design.

The respective concave portions formed on a side wall surface of the multilayer bottle of the present invention satisfy the following requirements (4) to (6) at the same time, for example, when observed in the vertical sectional view of the multilayer bottle as shown in FIG. 1:

(4) an angle (Aa) between a tangential line of a bottom of the concave portion and a tangential line of a side face of the concave portion being 100° or more;

(5) an angle (Ab) between a tangential line of the side wall surface of the bottle and a tangential line of the side face of the concave portion being 80° or less; and (6) a depth (Ac) of the concave portion being 10% or less of an outer diameter of a portion including the concave portion.

The tangential line of the side face of the concave portion is a tangent passing through a point inflection point) at which a curved line indicating the side face of the concave portion is changed from a downward convex shape to an upward convex shape or from an upward convex shape to a downward convex shape when observed in the vertical sectional view of the concave portion as shown in FIG. 1.

The angle (Aa) is preferably 120° or more and more preferably 1350 or more. The angle (Ab) is preferably 700 or less and more preferably 600 or less. The depth (Ac) is preferably 6% or less, more preferably 3% or less and still more preferably 2% or less of the outer diameter of the portion including the concave portion.

Figure 2:
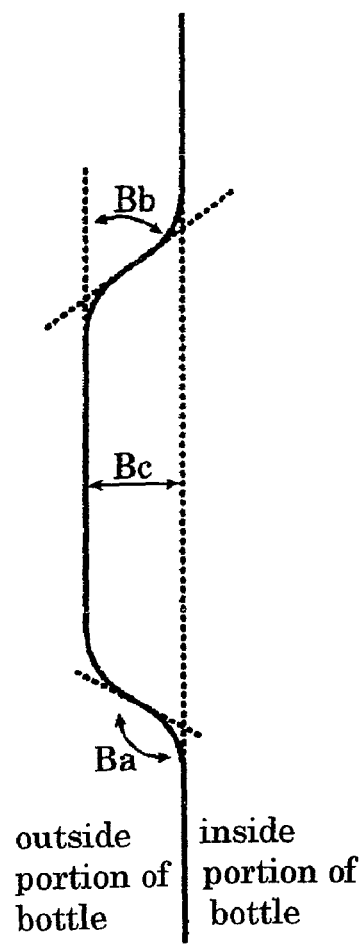
FIG. 2 is a vertical sectional view showing a convex portion of a multilayer bottle according to the present invention.

In addition, the respective convex portions formed on the side wall surface of the multilayer bottle of the present invention satisfy the following requirements (7) to (9) at the same time, for example, when observed in the vertical sectional view of the multilayer bottle as shown in FIG. 2:

(7) an angle (Ba) between a tangential line of the side wall surface of the bottle and a tangential line of a side face of the convex portion being 100° or more;

(8) an angle (Bb) between a tangential line of an apex of the convex portion and a tangential line of the side face of the convex portion being 80° or less; and (9) a height (Bc) of the convex portion being 10% or less of an outer diameter of a portion including the convex portion.

The tangential line of the side face of the convex portion is a tangent passing through a point inflection point) at which a curved line indicating the side face of the convex portion is changed from a downward convex shape to an upward convex shape or from an upward convex shape to a downward convex shape when observed in the vertical sectional view of the convex portion as shown in FIG. 2.

The angle (Ba) is preferably 120° or more and more preferably 135° or more. The angle (Bb) is preferably 70° or less and more preferably 600 or less. The height (Bc) is preferably 6% or less, more preferably 3% or less and still more preferably 2% or less of the outer diameter of the portion including the convex portion.

The side wall surface used herein means an outer surface of the barrel portion or a shoulder portion of the bottle, and does not include a bottom portion of a petaloid shape or a champagne shape. The shapes of the concave portions, the convex portions and the other portions are not particularly limited as long as the above requirements (4) to (6) and/or the above requirements (7) to (9) are satisfied, and may include a circular shape, an elliptical shape, a square shape and a band shape surrounding the bottle.

When the concave and convex portions of the multilayer bottle satisfy the above requirements (4) to (9), the barrier layer of the concave and convex portions exhibits a less and moderate change in thickness thereof. Therefore, when the bottle is exposed to impact upon dropping, etc., the impact energy applied to the bottle is not concentrated to a part of the barrier layer and received and relaxed by an entire part of the barrier layer, resulting in less occurrence of delamination therein. In addition, since the barrier layer undergoes a less deformation when impact is applied to the bottle, the delamination is unlikely to occur. Further, as far as the above requirements (4) to (6) and/or the above requirements (7) to (9) are satisfied, even though the bottle has a shape with many irregularities, the impact applied thereto is received and relaxed by an entire part of the bottle, so that delamination of the bottle is unlikely to occur. Therefore, the shape of the multilayer bottle is not particularly limited to those having less irregularities, resulting in large freedom of design. When the multilayer bottle satisfying the above requirements (4) to (6) and/or (7) to (9) further satisfies the above requirements represented by the formulae (1) to (3), the effect of preventing delamination of the bottle is further enhanced.

In the present invention, the material of the barrier layer is not particularly limited, and may be selected from various barrier resins capable of satisfying the requirement represented by the above formula (1) such as polyamides and ethylene-vinyl alcohol copolymers. Among these resins, polyamides, in particular, poly-m-xylyleneadipamide (polyamide MXD6), are preferred in view of a high barrier property as well as excellent co-injection moldability and co-stretch blow moldability with the polyester A (mainly with polyethylene terephthalate).

The polyamide MXD6 is produced by polycondensing a diamine component containing m-xylylenediamine as a main component with a dicarboxylic acid component containing an α,ω-linear aliphatic dicarboxylic acid having 4 to 20 carbon atoms as a main component.

The diamine component used for production of the polyamide MXD6 contains m-xylylenediamine in an amount of preferably 70 mol % or more, more preferably 75 mol % or more and still more preferably 80 mol % or more (including 100 mol %). When the content of the m-xylylenediamine in the diamine component lies within the above-specified range, the resultant polyamide MXD6 exhibits a good gas-barrier property. Examples of diamines other than m-xylylenediamine which are usable in the diamine component include, but are not limited to, aliphatic diamines such as tetramethylenediamine, pentamethylenediamine, 2-methyl pentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethyl-hexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl)ether, p-phenylenediamine, p-xylylenediamine and bis(aminomethyl)naphthalene.

The dicarboxylic acid component used for production of the polyamide MXD6 contains the α,ω-linear aliphatic dicarboxylic acid having 4 to 20 carbon atoms in an amount of preferably 50 mol % or more, more preferably 60 mol % or more and still more preferably 70 mol % or more (including 100 mol %). When the content of the α,ω-linear aliphatic dicarboxylic acid in the dicarboxylic acid component lies within the above-specified range, the resultant polyamide exhibits a high crystallinity and a good gas-barrier property. Examples of the α,ω-linear aliphatic dicarboxylic acid include aliphatic dicarboxylic acids such as succinic acid, glutaric acid, pimelic acid, suberic acid, azelaic acid, adipic acid, sebacic acid, undecadioic acid and dodecandioic acid. Among these α,ω-linear aliphatic dicarboxylic acids, preferred is adipic acid. Examples of dicarboxylic acids other the α,ω-linear aliphatic dicarboxylic acid which may be added to the dicarboxylic acid component include aromatic dicarboxylic acids such as terephthalic acid, isophthalic acid and 2,6-naphthalenedicarboxylic acid. In addition, a small amount of a molecular weight controller such as monoamines and monocarboxylic acids may be added upon polycondensation for production of the polyamide.

The polyamide MXD6 may be produced by melt-polycondensation method. For example, a nylon salt produced from m-xylylenediamine and adipic acid is heated under pressure in the presence of water, and the resultant molten salt is polymerized while removing therefrom water added and condensed water as produced. Alternatively, m-xylylenediamine may be directly added to molten adipic acid and polycondensed therewith under normal pressures. In the latter polycondensation method, in order to keep the reaction system in a uniform liquid state, m-xylylenediamine is continuously added to adipic acid, and the polycondensation reaction therebetween proceeds while heating the reaction system to a temperature not less than the melting points of oligoamide and polyamide produced. The polyamide MXD6 thus produced by the melt-polycondensation preferably has a relative viscosity of 2 to 2.4.

Further, the polyamide MXD6 obtained by the melt-polycondensation may be subjected to solid-state polymerization to obtain a higher molecular weight polyamide. The methods for producing the polyamides by melt-polycondensation and solid-state polymerization are not particularly limited, and these polyamides may be produced by using the conventionally known methods and polymerization conditions.

The polyamide MXD6 obtained by the solid-state polymerization preferably has a relative viscosity of 2.3 to 4.2. When the relative viscosity of the polyamide MXD6 obtained by the solid-state polymerization lies within the above-specified range, the polyamide can be formed into a multilayer bottle with a good moldability, and the obtained multilayer bottle can exhibit a good delamination resistance. Meanwhile, the relative viscosity used herein means the value obtained by measuring a viscosity of a solution prepared by dissolving 1 g of the polyamide in 100 ml of a 96% sulfuric acid, at 25° C. by using a Cannon-Fenske viscometer, etc.

The barrier resin may also contain a phosphorus compound in order to enhance a processing stability upon melt-molding or prevent undesired coloration. Examples of the phosphorus compound include phosphorus compounds containing alkali metals or alkali earth metals. Specific examples of the phosphorus compound include phosphates, hypophosphites and phosphites of alkali metals or alkali earth metals such as sodium, magnesium and calcium. Among these phosphorus compounds, hypophosphites of alkali metals or alkali earth metals are preferred because they have an especially excellent effect of preventing undesired coloration. The amount of the phosphorus compound used is preferably from 1 to 500 ppm, more preferably 350 ppm or less and still more preferably 200 ppm or less in terms of phosphorus atom. Even when the concentration of phosphorus atom added exceeds 500 ppm, the effect of preventing coloration is no longer improved, and rather the resultant film tends to suffer from increase in haze.

The barrier resin may also contain other polyamides for the purpose of further enhancing a delamination resistance. Examples of the other polyamides include aliphatic polyamides such as poly(6-aminohexanoic acid) (PA-6) also known as poly(caprolactam), poly(hexamethyleneadipamide) (PA-6,6), poly(7-aminoheptanoic acid) (PA-7), poly(10-aminodecanoic acid) (PA-10), poly(11-aminoundecanoic acid) (PA-11), poly(12-aminododecanoic acid) (PA-12), poly(hexamethylenesebacamide) (PA-6,10), poly(hexamethyleneazelamide) (PA-6.9), poly(tetramethyleneadipamide) (PA-4,6), caprolactam/hexamethyleneadipamide copolymer (PA-6,6/6) and hexamethyleneadipamide/caprolactam copolymer (PA-6/6,6); and amorphous semi-aromatic polyamides such as poly(hexamethyleneisophthalamide) (PA-6I), hexamethylenediamine/isophthalic acid/terephthalic acid copolymer (PA-6I/6T), poly(m-xylylenediamineisophthalmide) (PA-MXDI), hexamethylenediamine/m-xylylenediamine/isophthalic acid copolymer (PA-6/MDI) and hexamethylenediamine/adipic acid/isophthalic acid copolymer (PA-6/6I), though not particularly limited thereto.

Also, the barrier resin may be blended with one or plural kinds of other resins such as nylon 6, nylon 66, nylon 6,66, polyesters, olefin resins and phenoxy resins unless the addition of these resins adversely affects the effects of the present invention. In addition, the barrier resin may also contain various additives, e.g., inorganic fillers such as glass fibers and carbon fibers; plate-shaped inorganic fillers such as glass flakes, talc, kaolin, mica, montmorillonite and organized clay; impact modifiers such as various elastomers; nucleating agents; lubricants such as fatty amide-based compounds and fatty acid metal salt-based compounds; antioxidants such as copper compounds, organic or inorganic halogen-based compounds, hindered phenol-based compounds, hindered amine-based compounds, hydrazine-based compounds, sulfur-based compounds and phosphorus-based compounds; heat stabilizers; anti-coloring agents; ultraviolet absorbers such as benzotriazole-based compounds; mold release agents; plasticizers; colorants; flame retardants; oxygen scavengers such as cobalt metal compounds; and anti-gelling agents such as alkali compounds.

The barrier layer is preferably made mainly of polyamide MXD6. In view of a good barrier property, the content of polyamide MXD6 in the barrier layer is preferably 70% by weight or more and more preferably 80% by weight or more (including 100% by weight) on the basis of the weight of the barrier layer. When the barrier layer contains the resins other than polyamide MXD6 in an amount of more than 30% by weight, the OTR of the resultant multilayer bottle tends to exceed 0.2 cc·mm/(m$^2$·day·atm), resulting in poor barrier property thereof.

The multilayer bottle of the present invention might sometimes have portions having a low stretch ratio (i.e., from 1 to 2.5 times) depending upon a shape of the preform or bottle. The portions having such a low stretch ratio tends to be whitened when water is absorbed thereinto. Therefore, if required, an anti-whitening agent may be added to the barrier layer, thereby enabling production of a multilayer bottle having a good transparency.

The anti-whitening agent used in the present invention is made of a metal salt of an aliphatic acid having 18 to 50 carbon atoms and preferably 18 to 34 carbon atoms. The metal salt of aliphatic acid having 18 or more carbon atoms is expected to show a good anti-whitening effect, and the metal salt of aliphatic acids having 50 or less carbon atoms are uniformly dispersed in the barrier layer. The aliphatic acid may have a branched structure or a double bond. Examples of the aliphatic acid include linear saturated aliphatic acids such as stearic acid (C18), eicosanoic acid (C20), behenic acid (C22), montanoic acid (C28) and triacontanoic acid (C30). Examples of the metal capable of forming a salt with the aliphatic acid include, but are not limited to, sodium, potassium, lithium, calcium, barium, magnesium, strontium, aluminum and zinc. Of these metals, especially preferred are sodium, potassium, lithium, calcium, aluminum and zinc.

The aliphatic acid metal salts may be used singly or in combination of any two or more thereof. In the present invention, although the particle size of the aliphatic acid metal salt is not particularly limited, the aliphatic acid metal salt preferably has a particle size of 0.2 mm or less since smaller particles are readily uniformly dispersed in the barrier layer.

The amount of the aliphatic acid metal salt added is preferably from 0.005 to 1.0 part by weight, more preferably from 0.05 to 0.5 part by weight and still more preferably from 0.12 to 0.5 part by weight on the basis of 100 parts by weight of the total amount of the barrier resin. When the content of the aliphatic acid metal salt in the barrier resin lies within the above-specified range, the anti-whitening effect can be sufficiently exhibited, and the resultant multilayer bottle can maintain a low haze.

One or more diamide compounds and/or one or more diester compounds described below may be added as the anti-whitening agent in place of the above aliphatic acid metal salts.

The diamide compounds are produced by reacting an aliphatic acid having 8 to 30 carbon atoms with a diamine having 2 to 10 carbon atoms. The diamide compounds obtained from the aliphatic acid having 8 or more carbon atoms and the diamine having 2 or more carbon atoms are expected to show a good anti-whitening effect, and the diamide compounds obtained from the aliphatic acid having 30 or less carbon atoms and the diamine having 10 or less carbon atoms are uniformly dispersed in the barrier layer. The aliphatic acid may have a branched structure or a double bond. Of these aliphatic acids, preferred are linear saturated aliphatic acids.

Examples of the aliphatic acid component of the diamide compounds include stearic acid (C18), eicosanoic acid (C20), behenic acid (C22), montanoic acid (C28) and triacontanoic acid (C30). Examples of the diamine component of the diamide compounds include ethylenediamine, butylenediamine, hexanediamine, xylylenediamine and bis(aminomethyl)cyclohexane. Of these diamide compounds, preferred are diamide compounds obtained from an aliphatic acid having 8 to 30 carbon atoms and a diamine composed mainly of ethylenediamine, and diamide compounds obtained from an aliphatic acid composed mainly of montanoic acid and a diamine having 2 to 10 carbon atoms.

The diester compounds are produced by reacting an aliphatic acid having 8 to 30 carbon atoms with a diol having 2 to 10 carbon atoms. The diester compounds obtained from the aliphatic acid having 8 or more carbon atoms and the diol having 2 or more carbon atoms are expected to show a good anti-whitening effect, and the diester compounds obtained from the aliphatic acid having 30 or less carbon atoms and the diol having 10 or less carbon atoms are uniformly dispersed in the barrier layer. The aliphatic acid may have a branched structure or a double bond. Of these aliphatic acids, preferred are linear saturated aliphatic acids.

Examples of the aliphatic acid component of the diester compounds include stearic acid (C18), eicosanoic acid (C20), behenic acid (C22), montanoic acid (C28) and triacontanoic acid (C30). Examples of the diol component of the diester compounds include ethylene glycol, propanediol, butanediol, hexanediol, xylylene glycol and cyclohexane dimethanol. Of these diester compounds, especially preferred are diester compounds obtained from an aliphatic acid composed mainly of montanoic acid and a diol composed mainly of ethylene glycol and/or 1,3-butane diol.

The amount of the diamide compound and/or the diester compound added is preferably from 0.005 to 1 part by weight, more preferably from 0.05 to 0.5 part by weight and still more preferably from 0.12 to 0.5 part by weight on the basis of 100 parts by weight the total amount of the barrier resin. When the amount of the diamide compound and/or the diester compound added to the barrier resin lies within the above-specified range, the anti-whitening effect can be sufficiently exhibited, and the resultant multilayer bottle can maintain a low haze.

The anti-whitening agent may be added and mixed in the barrier resin by the conventionally known methods. For example, pellets of the barrier resin, the anti-whitening agent and the other additives may be charged into a rotary hollow container and mixed together therein. In addition, there may be adopted a method in which after producing a barrier resin composition containing a high concentration of the anti-whitening agent, the thus produced resin composition is diluted with pellets of a barrier resin containing no anti-whitening agent to prepare a resin composition having a predetermined concentration of the anti-whitening agent, followed by melt-kneading the resultant resin composition; or a method in which after melt-kneading, the resultant resin composition is successively shaped by injection-molding method, etc.

When using the anti-whitening agent, the barrier layer can be prevented from suffering from whitening immediately after production of the multilayer bottle. Further, even after being preserved for a long period of time under whitening-free or hardly-whitening conditions, the barrier layer can also be prevented from suffering from whitening. More specifically, when the multilayer bottle that has been preserved for a long period of time under such conditions under which the barrier layer is free from whitening or hardly undergo whitening even without adding any anti-whitening agent thereto, e.g., at a temperature of 23° C. and a relative humidity of 50%, is exposed to a high humidity, contacted with water or boiled water or heated to a temperature higher than the glass transition temperature of the resins, the occurrence of whitening of the barrier layer is inhibited similarly to immediately after molding.

The multilayer bottle of the present invention is produced, for example, by the following procedure. That is, for example, using an injection molding machine equipped with two injection cylinders, the polyester A and the barrier resin are respectively injected from the skin-side injection cylinder (cylinder temperature: from 260 to 300° C.) and the core-side injection cylinder (cylinder temperature: from 240 to 280° C.) into a cavity of a metal mold (from 5 to 20° C.) through a metal mold hot runner (from 260 to 310° C.) to produce a multilayer preform, and then the obtained multilayer preform is subjected to biaxial stretch blow molding to obtain the multilayer bottle.

In order to produce the multilayer bottle capable of satisfying the requirements represented by the formulae (2) and (3), the conditions for the biaxial stretch blow molding are important. Upon the biaxial stretch blow molding, the multilayer preform is heated, and then while stretching the multilayer preform within the metal mold in the longitudinal direction using a rod, a high-pressure air is blown into the preform and stretched in the lateral direction. The stretched condition of the multilayer preform varies depending upon the blow molding conditions such as heating temperature and heating time of the multilayer preform, stretching rod pressure, timing of blowing the high-pressure air and pressure of the high-pressure air. The optimum blow molding conditions vary depending upon kind of the polyester A, kind of the barrier resin, shape of the preform and design of the bottle. For example, when the preform is subjected to blow molding under the conditions described below, it is possible to produce a multilayer bottle capable of satisfying the requirements represented by the formulae (2) and (3). The preform is usually heated by several or more heaters. In this case, an output power balance of the heaters is preferably controlled in a suitable manner. In addition, since the adequate output power balance of the heaters as well as the adequate heating temperature and heating time of the preform vary depending upon outside air temperature and temperature of the preform, the blow molding is preferably conducted in a room controlled to constant temperature and humidity. Further, if the barrier layer is non-uniformly distributed in the multilayer preform, the multilayer bottle obtained after blow molding fails to satisfy the requirement represented by the formula (3). Therefore, the barrier layer is preferably present in a uniformly distributed state in the multilayer preform. Also, the preform is preferably produced in view of a stretch ratio, etc. Meanwhile, the stretch ratio when the preform is molded into a bottle is preferably from about 9 to 13 times in terms of an area ratio.

In the present invention, the blow molding is preferably performed as follows. That is, while heating the preform and stretching the preform in the longitudinal direction within the metal mold using a rod, a high-pressure air is blown into the preform at two stages (primary blow molding and secondary blow molding) by changing at least a blow pressure. When the high-pressure air is blown into the preform at one stage, the resultant multilayer bottle tends to suffer from not only defective molding but also deterioration in delamination resistance.

In the present invention, the heating temperature of the preform is preferably from 90 to 110° C. and more preferably from 95 to 108° C. When the heating temperature of the preform is lower than 90° C., the barrier layer or the PET layer tends to be cold-stretched and whitened owing to insufficient heating. When the heating temperature of the preform is higher than 110° C., the barrier layer tends to be crystallized and whitened, and further tends to be sometimes deteriorated in delamination resistance.

The longitudinal stretching and the blow molding (primary blow molding and secondary blow molding) using the rod are sequentially conducted, for example, within a metal mold maintained at a temperature of from 20 to 80° C. (from 120 to 150° C. upon heat-setting). The longitudinal stretching using the rod is preferably conducted at a rod pressure of from 0.5 to 1.5 MPa for a period of from 0.1 to 1 s such that the stretch ratio is from 1.5 to 3.5 times. The primary blow retardation time (time elapsed from starting of operation of the stretching rod to initiation of the primary blow molding) is preferably from 0 to 0.6 s.

The primary blow pressure is preferably from 0.8 to 1.8 MPa, more preferably from 0.9 to 1.5 MPa and still more preferably from 1.0 to 1.3 MPa. When the primary blow pressure lies within the above-specified range, the resultant multilayer bottle exhibits a good delamination resistance. The primary blow molding time is preferably from 0.1 to 0.5 s.

The secondary blow molding is preferably performed at a secondary blow pressure of from 2 to 4 MPa for a period of from 1 to 3 s. When the secondary blow pressure is less than 2 MPa, the resultant multilayer bottle tends to suffer from not only defective molding but also deterioration in mechanical properties. After completion of the secondary blow molding, it is preferred that the high-pressure air is evacuated for a period of from 0.1 to 1 s to return the system to normal pressures.

When conducting the step of injecting the polyester A forming the innermost and outermost layers from the skin-side injection cylinder and injecting the barrier resin forming the barrier layer from the core-side injection cylinder, the polyester A is first injected and then the barrier resin and the polyester A are injected at the same time, and further a necessary amount of the polyester A is injected to fulfill a cavity of the metal mold, thereby producing a multilayer preform having a three-layer structure (composed of a polyester A layer, a barrier layer and a polyester A layer).

Alternatively, upon conducting the step of injecting the polyester A forming the innermost and outermost layers from the skin-side injection cylinder and injecting the barrier resin forming the barrier layer from the core-side injection cylinder, the polyester A is first injected and then the barrier resin solely is injected, and finally the polyester A is injected to fulfill the cavity of the metal mold, thereby producing a multilayer preform having a five-layer structure (composed of a polyester A layer, a barrier layer, a polyester A layer, a barrier layer and a polyester A layer). Meanwhile, the method for production of the multilayer preform is not limited to the above methods.

The multilayer bottle capable of satisfying the requirements (4) to (6) and/or the requirements (7) to (9) is produced, for example, by subjecting the multilayer preform to blow molding in the above-described manner by using a metal mold having a convex portion and/or a concave portion satisfying the above requirements.

The thickness of the polyester A layer in the multilayer bottle is preferably from 0.01 to 1 mm, and the thickness of the barrier layer therein is preferably from 0.005 to 0.2 mm (from 5 to 200 em). The thickness of the multilayer bottle is not necessarily constant over an entire part thereof, and is usually in the range of from 0.2 to 1 mm.

In the multilayer bottle obtained by subjecting the multilayer preform to biaxial stretch blow molding, the barrier layer may be provided at least in the barrel portion of the multilayer bottle in order to allow the bottle to exhibit a good gas-barrier property. However, when the barrier layer extends near a tip end of a mouth portion of the bottle, the gas-barrier property of the multilayer bottle can be further enhanced.

The weight of the barrier layer in the multilayer bottle of the present invention is preferably from 1 to 20% by weight, more preferably from 2 to 15% by weight and still more preferably from 3 to 10% by weight on the basis of the total weight of the multilayer bottle. When the weight of the barrier layer lies within the above-specified range, the resultant multilayer bottle can exhibit a good gas-barrier property, and the multilayer preform as a precursor can be readily molded into the multilayer bottle.

The multilayer bottle of the present invention is prevented from undergoing delamination owing to drop or impact. In addition, the multilayer bottle has a large freedom of design without limitations to specific shapes with less irregularities or less bends because delamination of the multilayer bottle hardly occurs even at its portions having an irregular or bending shape. The multilayer bottle of the present invention is used to store and preserve various products therein. Examples of the products stored or preserved in the multilayer bottle include liquid beverages such as carbonated beverage, juice, water, milk, sake, whisky, shochu, coffee, tea, jelly beverage and healthy beverage, seasonings such as liquid seasoning, sauce, soy sauce, dressing and liquid soup stock, liquid processed foodstuffs such as liquid soup, liquid drugs, beauty wash, milky lotion, hair dressing, hair dye, shampoo, etc.

EXAMPLES

The present invention will be described in more detail below with reference to the following examples and comparative examples. However, these examples are only illustrative and not intended to limit the invention thereto. Meanwhile, various properties of the multilayer bottle were measured and evaluated by the following methods.

(1) Degree of Orientation

Using an Abbe refractometer "DR-M2" available from Atago Co., Ltd., the refractive index of the barrier layer was measured at 23° C. by applying a sodium D ray (589 nm) thereto to calculate a degree of orientation thereof according to the formula described above.

(2) Height of Delamination

According to ASTM D2463-95 Procedure B, the bottle was subjected to drop test to measure a height of delamination thereof (minimum drop distance causing delamination of the bottle). First, the multilayer bottle to be tested was filled with water and capped, and then vertically dropped such that a bottom portion of the multilayer bottle was impinged against a floor to visually observe occurrence of any delamination therein. Upon the drop test, the drop height of the multilayer bottle was increased at intervals of 15 cm, and the 30 multilayer bottles were subjected to the drop test.

(3) Oxygen Transmission Rate (OTR):

The oxygen transmission rate (OTR) of the multilayer bottle was measured at 23° C. and a relative humidity of 50% according to ASTM D3985 using a measuring apparatus "OX-TRAN 10/50A" available from Modern Controls Corp. Meanwhile, upon measuring the OTR of the barrier layer, the bottle was carefully delaminated to separate and sample the barrier layer solely therefrom. Meanwhile, in the case where it was difficult to separate and sample the barrier layer solely from the bottle, the OTR of the barrier layer was determined as follows. That is, after measuring the OTR of a multilayer film piece cut from the barrel portion of the bottle and then measuring the thicknesses of the respective layers in the film piece using a microscope, the OTR of the barrier layer solely was calculated from these measured values by using the known OTR value of the polyester A layer. Alternatively, the OTR of the barrier layer was also calculated from the measured OTR of the bottle, the surface area of the bottle, the thicknesses of the respective layers in the bottle and the known OTR value of the polyester A layer.

(4) Angle, Depth and Height of Concave and Convex Portions

The shapes of the concave and convex portions of the bottle were measured by irradiating a laser thereto by using a measuring device "SURFCOM3000A" available from ACCRETECH Corp., and the measured data were analyzed by an associated software.

Example 1

Under the following conditions, the raw resin materials were injection-molded to form a three-layer preform (27 g) composed of a polyester layer, a barrier layer and a polyester layer, and the resultant preformed was cooled and then subjected under heating to biaxial stretch blow molding, thereby obtaining a multilayer bottle. The blow molding conditions are shown in Table 1. Also, the results of measurement and evaluation of the multilayer bottle are shown in Table 2.

(1) Polyester Layer

Polyethylene terephthalate "RT543C" available from Nippon Unipet Co., Ltd., having a intrinsic viscosity of 0.75 as measured at 30° C. in a mixed solvent containing phenol and tetrachloroethane at a weight ratio of 6/4.

(2) Barrier Layer

Polyamide MXD6 "MX Nylon S6007 (solid-state polymerization product)" available from Mitsubishi Gas Chemical Co., Inc., having a relative viscosity of 2.70 as measured at 25° C. in a solution prepared by dissolving 1 g of the resin in 100 mL of 96% sulfuric acid.

(3) Three-Layer Preform

The three-layer preform having a whole length of 95 mm, an outer diameter of 22 mmφ, and a wall thickness of 4.2 mm was produced using an injection molding machine (Model: "M200"; four-shot molding type) available from Meiki Seisakusho Co., Ltd.

(4) Molding Conditions for Three-Layer Preform:

| | |
|---|---|
| Skin-side injection cylinder temperature: | 280° C. |
| Core-side injection cylinder temperature: | 260° C. |
| Mold runner temperature: | 280° C. |
| Mold cooling water temperature: | 15° C. |
| Proportion of barrier resin in preform: | 5% by weight |

(5) Multilayer Bottle

Whole length: 223 mm; outer diameter: 65 mmφ; capacity: 500 mL; bottom shape: champagne bottle shape; no concave nor convex portion in a barrel portion.

Meanwhile, the biaxial stretch blow-molding was performed using a blow molding machine (Model: "EFB 10ET") available from Frontier Inc.

Examples 2 to 4 and Comparative Example 1

The same procedure as in Example 1 was repeated except that the blow molding conditions were changed as shown in Table 1, thereby obtaining multilayer bottles. The results of measurement and evaluation of the thus obtained multilayer bottles are shown in Table 2.

From the results of Examples 1 to 4 and Comparative Example 1, it was confirmed that the bottles satisfying the requirements (OTR, degree of orientation and thickness of the barrier layer) represented by the formulae (1) to (3) at the same time exhibited a very excellent delamination resistance, whereas the bottle not satisfying the requirements at the same time was deteriorated in delamination resistance.

TABLE 1

| | Examples | | | | Comparative Example |
|---|---|---|---|---|---|
| | 1 | 2 | 3 | 4 | 1 |
| Heating temperature of preform (° C.) | 108 | 101 | 102 | 105 | 106 |
| Stretching rod pressure (MPa) | 0.5 | 0.5 | 0.5 | 0.5 | 0.5 |
| Primary blow retardation time (s) | 0.34 | 0.28 | 0.32 | 0.30 | 0.36 |
| Primary blow pressure (MPa) | 1.1 | 0.9 | 1.2 | 1.0 | 0.6 |
| Primary blow time (s) | 0.30 | 0.28 | 0.30 | 0.29 | 0.30 |
| Secondary blow pressure (MPa) | 2.5 | 2.5 | 2.5 | 2.5 | 2.5 |
| Secondary blow time (s) | 2.0 | 2.0 | 2.0 | 2.0 | 2.0 |
| Blow evacuation time (s) | 0.6 | 0.6 | 0.6 | 0.6 | 0.6 |
| Metal mold temperature (° C.) | 30 | 30 | 30 | 30 | 30 |

TABLE 2

| Height from ground portion of bottle (mm) Shoulder portion | Examples 1 | Examples 2 | Examples 3 | Examples 4 | Comparative Example 1 |
|---|---|---|---|---|---|
| 190 | 42 | 53 | 63 | 48 | 48 |
| 180 | 32 | 40 | 50 | 39 | 39 |
| 170 | 27 | 33 | 43 | 34 | 34 |
| 160 | 24 | 28 | 41 | 30 | 30 |
| 150 | 23 | 26 | 35 | 29 | 29 |
| 140 | 22 | 23 | 31 | 29 | 27 |
| 130 | 21 | 21 | 27 | 28 | 25 |
| Barrel portion | | | | | |
| 120 | 20 | 21 | 26 | 28 | 23 |
| 110 | 20 | 21 | 25 | 27 | 20 |
| 100 | 20 | 20 | 25 | 27 | 19 |
| 90 | 20 | 20 | 26 | 27 | 20 |
| 80 | 20 | 21 | 26 | 27 | 18 |
| 70 | 20 | 20 | 26 | 27 | 17 |
| 60 | 20 | 20 | 25 | 28 | 20 |
| 50 | 20 | 20 | 25 | 20 | 26 |
| Bottom portion | | | | | |
| 40 | 22 | 21 | 25 | 15 | 30 |
| 30 | 23 | 21 | 25 | 12 | 37 |
| 20 | 26 | 24 | 27 | 8 | 42 |
| 10 | 31 | 27 | 26 | 3 | 47 |
| 0 | 36 | 29 | 27 | 0 | 50 |
| Average thickness of barrier layer (μm) | | | | | |
| Shoulder portion (a) | 20 | 20 | 26 | 26 | 20 |
| Bottom portion (b) | 28 | 24 | 26 | 8 | 41 |
| b/a × 100 | 137 | 119 | 102 | 29 | 202 |
| Degree of orientation | 29 | 23 | 31 | 25 | 5 |
| Height of delamination (cm) | 300 | 280 | 312 | 295 | 92 |
| OTR (cc · mm/(m² · day · atm)) | 0.075 | 0.082 | 0.073 | 0.081 | 0.084 |

Examples 5 to 8 and Comparative Example 2

The same procedures as in Examples 1 to 4 and Comparative Example 1 were respectively repeated except that the shape of the multilayer bottle was changed as mentioned below.

Shape of Multilayer Bottle

Whole length: 223 mm; outer diameter: 65 mmϕ; capacity: 500 mL; bottom shape: petaloid type; six concave or convex portions having a length of 5 cm and a width of 1 cm were formed on a barrel portion.

From the results of Examples 5 to 8 and Comparative Example 2, it was confirmed that the bottles satisfying the requirements (4) to (6) or the requirements (7) to (9) at the same time exhibited a very excellent delamination resistance, whereas the bottle not satisfying the requirements at the same time was deteriorated in delamination resistance.

TABLE 3

| | Examples 5 | Examples 6 | Examples 7 | Examples 8 | Comparative Example 2 |
|---|---|---|---|---|---|
| Aa (°) | 134 | 121 | 150 | — | 98 |
| Ab (°) | 72 | 55 | 64 | — | 85 |
| Ac (%) | 2.3 | 5.8 | 1.6 | — | 3.0 |
| Ba (°) | — | — | — | 142 | — |
| Bb (°) | — | — | — | 53 | — |
| Bc (%) | — | — | — | 1.4 | — |
| Height of delamination (cm) | 285 | 266 | 296 | 280 | 87 |
| OTR (cc · mm/(m² · day · atm)) | 0.075 | 0.082 | 0.073 | 0.081 | 0.084 |

INDUSTRIAL APPLICABILITY

In accordance with the present invention, it is possible to obtain a multilayer bottle that is free from delamination owing to impact upon dropping, etc., even when irregularities or bends are formed on a side wall surface thereof, and exhibits an excellent gas barrier property. Thus, the multilayer bottle is enhanced in freedom of a container shape thereof without occurrence of delamination, and, therefore, the present invention has large industrial value and meaning.

The invention claimed is:

1. A multilayer bottle produced by biaxial stretch blow molding of a multilayer preform produced by injection of two resins respectively into a cavity of a mold, comprising a barrel portion including an outermost layer, an innermost layer and at least one barrier layer interposed between the outermost layer and the innermost layer, wherein the outermost layer and the innermost layer are each made mainly of a thermoplastic polyester resin obtained by polymerizing a dicarboxylic acid component containing 80 mol % or more of terephthalic acid with a diol component containing 80 mol % or more of ethylene glycol; and the multilayer bottle satisfies the requirements represented by the following formulae (1) to (3) at the same time:

$$OTR \leq 0.2 \text{ cc·mm/(m}^2\text{·day·atm)} \quad (1)$$

where OTR represents an average oxygen transmission rate of the barrier layer of the barrel portion as measured at a temperature of 23° C. and a relative humidity of 60%;

$$20 \leq (\text{Average degree of orientation of barrier layer of barrel portion}) \leq 45 \quad (2)$$

where the degree of orientation represents a value calculated from refractive indices of the barrier layer as measured at 23° C. using an Abbe refractometer according to the following formula:

$$\text{Degree of orientation} = [\{n(x)+n(y)\}/2 - n(z)] \times 1000$$

where $n(x)$ represents a refractive index of the barrier layer in a height direction of the bottle; $n(y)$ represents a refractive index of the barrier layer in a circumferential direction of the bottle; and $n(z)$ represents a refractive index of the barrier layer in a thickness direction thereof; and $$0 \leq b/a \times 100 \leq 200 \quad (3)$$

where "a" represents an average thickness (μm) of the barrier layer of the barrel portion; and "b" represents an average thickness (μm) of the barrier layer of a bottom portion of the bottle, wherein, in the above respective formulae, the bottom portion is defined as a portion extending from a ground portion of the bottle to a position corresponding to 20% of a height between the ground portion and an opening portion of the bottle; the barrel portion is defined as a portion except for the ground portion which has an outer diameter corresponding to 80% or more of a maximum outer diameter of the ground portion; and the ground portion is defined as a portion contacting with a floor when the bottle is vertically placed thereon.

2. The multilayer bottle according to claim 1, wherein the bottle has a three-layer structure comprising a thermoplastic polyester resin layer, a barrier layer and a thermoplastic polyester resin layer.

3. The multilayer bottle according to claim 1, wherein the bottle has a five-layer structure comprising a thermoplastic polyester resin layer, a barrier layer, a thermoplastic polyester resin layer, a barrier layer and a thermoplastic polyester resin layer.

4. The multilayer bottle according to claim 1, wherein the barrier layer is made mainly of a polyamide produced by polycondensing a diamine component containing 70 mol % or more of m-xylylenediamine with a dicarboxylic acid component containing 50 mol % or more of an α,ω-linear aliphatic dicarboxylic acid having 4 to 20 carbon atoms.

5. The multilayer bottle according to claim 1, wherein a weight of the barrier layer is 1 to 20% by weight on the basis of a total weight of the multilayer bottle.

6. The multilayer bottle according to claim 1, wherein the bottle is provided on a side wall surface thereof with at least one concave portion and/or at least one convex portion, the concave portion satisfies the following requirements (4) to (6) at the same time:

(4) an angle (Aa) between a tangential line of a bottom of the concave portion and a tangential line of a side face of the concave portion being 100° or more;
(5) an angle (Ab) between a tangential line of the side wall surface of the bottle and a tangential line of the side face of the concave portion being 80° or less; and
(6) a depth (Ac) of the concave portion being 10% or less of an outer diameter of a portion including the concave portion, and the convex portion satisfies the following requirements (7) to (9) at the same time:

(7) an angle (Ba) between a tangential line of the side wall surface of the bottle and a tangential line of a side face of the convex portion being 100° or more;
(8) an angle (Bb) between a tangential line of an apex of the convex portion and a tangential line of the side face of the convex portion being 80° or less; and
(9) a height (Bc) of the convex portion being 10% or less of an outer diameter of a portion including the convex portion.

7. The multilayer bottle according to claim 1, wherein the thermoplastic polyester resin has an intrinsic viscosity of from 0.55 to 1.30.

8. The multilayer bottle according to claim 1, wherein the barrier layer is made of a material selected from the group consisting of polyamides and ethylene-vinyl alcohol copolymers.

* * * * *